United States Patent
Highnam et al.

(10) Patent No.: US 9,865,067 B2
(45) Date of Patent: Jan. 9, 2018

(54) METHOD OF RECONSTRUCTION OF AN OBJECT FROM PROJECTION VIEWS

(71) Applicants: Ralph Highnam, Weelington (NZ); John Michael Brady, Headinton (GB)

(72) Inventors: Ralph Highnam, Wellington (NZ); John Michael Brady, Headington (GB); Nico Karssemeijer, Ubbergen (NL); Martin Yaffe, Toronto (CA)

(73) Assignee: VOLPARA HEALTH TECHNOLOGIES LIMITED, Wellington (NZ)

( * ) Notice: Subject to any disclaimer, the term of this patent is extended or adjusted under 35 U.S.C. 154(b) by 98 days.

(21) Appl. No.: 14/895,717

(22) PCT Filed: Jun. 6, 2014

(86) PCT No.: PCT/GB2014/000217
§ 371 (c)(1),
(2) Date: Dec. 3, 2015

(87) PCT Pub. No.: WO2014/195669
PCT Pub. Date: Dec. 11, 2014

(65) Prior Publication Data
US 2016/0133033 A1    May 12, 2016

(30) Foreign Application Priority Data

Jun. 6, 2013 (NZ) .................... NZ611584
Jun. 6, 2013 (NZ) .................... NZ611592
Sep. 26, 2013 (NZ) .................... NZ615945

(51) Int. Cl.
*G06T 11/00* (2006.01)

(52) U.S. Cl.
CPC .......... *G06T 11/008* (2013.01); *G06T 11/005* (2013.01); *G06T 2207/10081* (2013.01); *G06T 2207/10112* (2013.01); *G06T 2207/30068* (2013.01); *G06T 2207/30096* (2013.01); *G06T 2211/436* (2013.01)

(58) Field of Classification Search
CPC ................. G06T 11/005; G06T 11/008; G06T 2207/10081; G06T 2207/10112; G06T 2207/30068; G06T 2207/30096; G06T 2211/436
See application file for complete search history.

(56) References Cited

U.S. PATENT DOCUMENTS

2009/0076382 A1* 3/2009 Shepherd ................. A61B 6/12
600/426

OTHER PUBLICATIONS

Malkov et al., "Novel Single X-Ray Absorptiometry Method to Solve for Volumetric Breast Density in Mammograms with Paddle Tilt", Medical Imaging. International Society for Optics and Photonics, 2007.*

(Continued)

*Primary Examiner* — Katrina Fujita
(74) *Attorney, Agent, or Firm* — William H. Bollman

(57) ABSTRACT

The present invention relates to a method of reconstruction of an object from projections, more particularly to a quantitative reconstruction of an object from projection views of the object. For example, quantitative reconstruction of an image of a human breast from projection views generated by digital breast tomosynthesis (DBT), computed tomography (CT), or standard mammography, and use of the reconstruction to identify densest regions.

4 Claims, 5 Drawing Sheets

(56) References Cited

OTHER PUBLICATIONS

Kallenberg et al. "Compression paddle tilt correction in full-field digital mammograms." Physics in medicine and biology 57.3 (2012): 703-715.*

Kallenberg et al. "Effect of compression paddle tilt correction on volumetric breast density estimation." Physics in medicine and biology 57.16 (2012): 5155-5168.*

Kallenberg et al. "Comparison of tilt correction methods in full field digital mammograms." Digital Mammography (2010): 191-196.*

Malkov et al. "Single x-ray absorptiometry method for the quantitative mammographic measure of fibroglandular tissue volume." Medical physics 36.12 (2009): 5525-5536.*

Snoeren et al. "Thickness correction of mammographic images by means of a global parameter model of the compressed breast." IEEE transactions on medical imaging 23.7 (2004): 799-806.*

\* cited by examiner

METHOD OF RECONSTRUCTION OF AN OBJECT FROM PROJECTION VIEWS

FIELD OF THE INVENTION

The present invention relates to a method of reconstruction of an object from projections, more particularly to a quantitative reconstruction of an object from projection views of the object. For example, quantitative reconstruction of an image of a human breast from projection views generated by digital breast tomosynthesis (DBT), computed tomography (CT), or standard mammography, and use of the reconstruction to identify densest regions.

BACKGROUND

It has been established that early diagnosis of breast cancer significantly improves prognosis by enabling effective therapy and by avoiding metastatic spread of disease. To this end, breast cancer screening, primarily of post-menopausal women, has been introduced in many countries. Such screening is currently predominantly based on mammography.

The use of mammography on post-menopausal women is predicated on the observation that the menopause initiates a complex process known as involution whereby dense tissue converts gradually to fat. 'Dense tissue' describes the fibroglandular (glandular and connective) tissue in the breast. Volumetric breast density is defined as the volume of fibroglandular tissue divided by the volume of the breast. Dense tissue attenuates x-rays to a greater extent than fat, which is relatively transparent.

Since tumours and microcalcifications (often a precancerous sign) are also radiologically dense, they are often relatively easy to detect in the breast of patients whose breasts are primarily fatty. Indeed, it has been shown that the chance of detecting tumours and microcalcifications in a patient with a fatty breast is high, sometimes up to 98%. Thus, standard mammography is known to be effective for use in screening fatty breasts, as a lack of dense tissue does not hide cancers and there is consequently less chance of tissues being projected on to one another to give the appearance of tumour from resultant overlap.

Tomosynthesis is a near-3D form of mammography and thus tomosynthesis images are not so compromised by projection of overlapping tissues. However cancers can still be hidden in dense tissue in an individual 'slice', the reconstruction can blur density across slices. Tomosynthesis is consequently not ideal for very dense breasts, and some studies undertaken to demonstrate the efficacy of tomosynthesis to detect microcalcifications have been inconclusive.

The chance of detecting tumours and microcalcifications in a patient with a dense breast is around 50%, thus assessment of mammograms increasingly comprises estimation and consideration of a patient's breast density. If the breast density is over a certain value then the patient may benefit from additional imaging techniques such as ultrasound, MRI, or DBT to aid early detection of tumours. Alternatively or additionally the clinician might choose to examine the x-rays in more detail: for example, window and levelling those areas of the breast which have dense tissue in a different fashion to those areas which are fatty, or by carefully studying change over time of dense tissue.

There are a number of reasons why breast tissue may be dense: for example, a patient may not have entered the menopause (mammography has been shown to be not as effective clinically in younger or pre-menopausal women); the breast may not involute to fat for some reason; the woman might be taking hormone replacement drugs (or similar); or she might simply have lost weight. Information about change over time is clinically important: it has been reported, for example, that women whose breast density does not decrease with age are at more risk of developing breast cancer.

It is neither cost effective nor practical for every patient to undergo imaging additional to mammography not only due to the inherent cost of such extensive imaging, but also due to the numbers of false positives likely generated and, with certain additional imaging, the risk associated with extra radiation.

It is thus becoming a prerequisite for additional imaging that there exists an objective, reproducible, trans-modality, quantitative method of assessing breast density to ensure that only those women who need additional imaging receive it, due to the masking risk of dense tissue, or increased risk of cancer developing.

SUMMARY OF THE INVENTION

According to a first aspect of the invention there is a method of quantitative reconstruction of a human breast of predetermined thickness (H) comprising the steps of: using an x-ray source to obtain a plurality of projection views of the breast where each view is offset by an angle $\theta$ (which might vary or be constant between views), using a reference point in one reference projection view to obtain a reference value ($Pfat_o$) for a reference projection view; estimating a total thickness (Z) between a pixel (x) and the x-ray source for each of the other projection views using a total thickness estimation equation; estimating a reference value ($Pfat_j$) for each of the other projection views (Ij using a reference value estimation equation, using the estimated reference value ($Pfat_j$) for each view to obtain a respective volume of fibroglandular tissue (Vj) for the projection view; adjusting the estimated reference value ($Pfat_j$) for each projection view, so that the difference between a volume (Vj) and (Vo) is within a predetermined range; and using a volumetric difference equation, to determine the volume of fibroglandular tissue in the human breast to a preselected accuracy.

Here a subscript 'j' refers to the projection view Ij. That for j being '0' the projection view referred to is the reference projection view. For 'Pfato' the subscript j is '0' hence Pfato refers to the value of this variable for the reference projection view. Similarly 'Vo' refers to the value of this variable for the reference projection view.

Projection views are two dimensional images of the breast. Projection views are taken looking through the breast. For example a projection view can be taken by projecting x-rays though the breast an onto an x-ray film. Projection views can be created by computer analysis of MRI scans and computer aided tomography scans and conventional x-ray and newer tomosynthesis units.

According to an aspect of the invention there is a method of quantitative reconstruction of an image of a human breast of predetermined thickness (H) comprising the steps of:

using an x-ray source to obtain a plurality of projection views of the breast where each view is offset another view by an angle theta($\theta$), using a tilt estimation algorithm to find the tilt across the breast and thus the variation in breast thickness due to the projections and paddle estimating a reference value (Pfatj) for each of the other projection views Ij using a reference value estimation equation, using the estimated reference value (Pfatj) for each view to obtain a respective volume of fibroglandular tissue (Vj) for the projection view, adjusting the estimated reference value (Pfatj) for each projection view to thereby determine the volume of fibroglandular tissue in the human breast to a preselected accuracy.

Preferably the breast is compressed so as to decrease in thickness across the breast from the chest wall towards the nipple by a paddle tilted at a paddle tilt angle corresponding to the decrease in thickness along the length.

Preferably the breast is compressed by a tilted paddle to a reduced thickness by a paddle so as to appear in an image formed from a projection view to decrease in thickness across the breast at a paddle tilt angle where the level of decrease across the breast corresponds to the angle theta.

Preferably the breast is compressed by a paddle and then appears as if tilted at a paddle tilt angle across the breast in the other projections due to the different projection angle, theta.

Preferably from each projection view an image formed comprised of pixels representing a level of attenuation of x-rays passed through the breast from the x-ray source.

Preferably the tilt estimation algorithm comprises the steps of using regression to fit a first plane to the x-ray attenuation corresponding to all of the pixels in the portion of the breast compressed by the paddle and obtaining 'an all tilt angle' from the slope of the plane.

Preferably the method also comprises the steps of: confirming the 'all tilt angle' is within a preselected range, and taking the 'all tilt angle' as the paddle tilt angle, if a preselected fraction of preselected points on the first plane line are within a preselected distance of the first plane.

Preferably the method also comprises the steps of
using regression to fit a second plane to the x-ray attenuation corresponding to pixels in the portion of the breast compressed by the paddle having less than a preselected percentage of fat,
and obtaining a 'fatty tilt angle' corresponding to the paddy tilt angle from slope of the second plane, and
taking the 'fatty tilt angle' as the paddle tilt angle,
if the preselected fraction of the points on the first plane are not within the preselected distance of the first regression line and a preselected fraction of preselected points the second regression line are within a preselected distance of the second regression line.

Preferably if the preselected fraction of preselected points on the second plane are not within a preselected distance of the second regression line, taking a default angle as the paddle tilt angle.

Preferably the volumetric difference equation is the difference between the volume of fibroglandular tissue of the standard projection view and any of the volume Vj of any other projection view.

According to another aspect of the invention there is a device arranged to quantitatively reconstruct of an image of a human breast of predetermined thickness (H) comprising:
an apparatus to obtain a plurality of projection views of a human breast by offsetting an x-ray source at an angle theta (θ) relative to the breast.
a device to implement a tilt estimation algorithm to find the tilt across the breast and thus the variation in breast thickness
a device to estimate a reference value (Pfatj) for each of the other projection views Ij using a reference value estimation equation,
a device to use the estimated reference value (Pfatj) for each view to obtain a respective volume of fibroglandular tissue (Vj) for the projection view,
adjusting the estimated reference value (Pfatj) for each projection view using a volumetric difference equation,
a device to thereby determine the volume of fibroglandular tissue in the human breast to a preselected accuracy.

Preferably the method of obtaining a tilt angle wherein if the preselected fraction of preselected points the second regression line are not within a preselected distance of the second regression line, that a default angle is taken as the paddle tilt angle.

The present invention relates to the robust quantitative reconstruction of an object from projection views of the object. For example, the quantitative reconstruction of the human breast from projection views generated by DBT, CT, or standard mammography, and from that reconstruction identification of the densest regions and of the optimal next imaging modality.

A quantitative reconstruction is made in 3D to identify the region or regions of highest density and their 3D locations within the breast. From such reconstruction, optimal imaging decisions can be made.

The quantitative reconstruction uses reference points from at least one view which is interpolated for other views, along with means to recognize the 3D shape of the object. In an exemplary embodiment of a method according to the present invention for quantitative reconstruction of an object, a reference point of all or almost all fat is found in a reference projection view. The reference value $P_{fat}$ represents the pixel value of a column of almost entirely fat tissue in a breast of thickness H.

The reference point found in the reference projection view is adjusted via an optimization algorithm.

In the exemplary embodiment the optimization algorithm is specific for other projection views. The optimization algorithm is also specific for the 3D shape of any particular object of interest. The optimization algorithm adjusts the reference point $P_{fat}$ so that it provides volumetric consistency across multiple views.

A full quantitative reconstruction is made 3D identify the region or regions of highest density. It is a further advantage of the present invention, that the reference value of fat for each projection, takes into consideration the changing breast thicknesses due to compression paddle tilt.

From such reconstruction, optimal imaging decisions can be made. If the reference point is not suitable, there might be quality issues with the imaging process. It is thus an advantage of the present invention that it generates quality control metrics.

DETAILED DESCRIPTION OF PREFERRED EMBODIMENTS OF THE INVENTION

Figure 1:
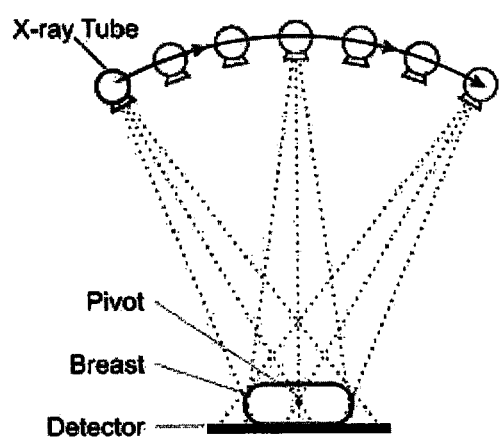
FIG. 1 shows a series of images taken at varying angles around the breast.

FIG. 1 shows a breast laid against a detector. The detector detects x-rays projected or passed through it that originate from an x-ray source. A projection view image is formed on the detector by the x-rays that pass through the breast.

Multiple projection view images can be formed on the detector with the apparatus shown in FIG. 1. By offsetting the detector in an arc around the pivot point different projection views of the breast are formed as images on the detector. The detector can be offset at angles theta by moving the detector along the arc. The standard or reference projection view is formed on the detector when the x-ray source is directly above the breast.

Figure 2:
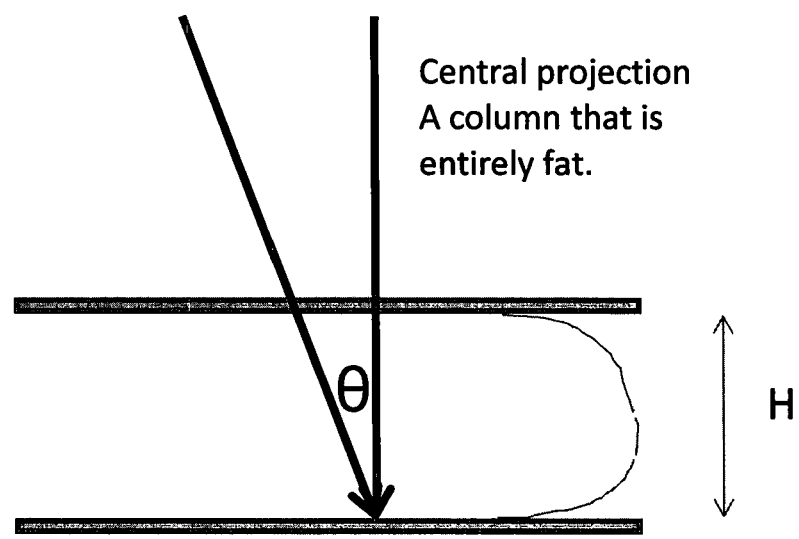
FIG. 2 shows the variation of breast thickness for a certain angle.

FIG. 2 shows close-up of the angle of offset of the x-ray source. Ideally the pivot point for the angle theta is in the breast just above the detector.

An illustrative embodiment relates to reconstruction of DBT views. A variable $h_{int}(x,v)$ denotes the thickness in millimetres of dense tissue between pixel x (in co-ordinates defined by the image sensor) and the x-ray source. A variable Ij denotes the view direction (i.e. the orientation of the central x-ray beam relative to the breast compression plate surface).

A reliable map of density of an object from projection views of the object is constructed. The value of density at each point in the map is a value relative to the density at a reference point covered by breast tissue of the compressed breast thickness. In particular a discrete reference point is located in each DBT projection view, taking into consideration the changing breast thicknesses due to projection angle.

Automated means for constructing a reliable map of density work well when a good reference point of all fat is found. In some cases a good reference point cannot be found. Reasons a good reference point may not be found are poor compression of the breast, the breast is extremely dense, or a reference point is found in the interior of a breast too far in from the breast edge, or the breast thickness variation in an image is too great.

In the illustrative embodiment related to reconstruction of DBT views a reference point with value Pfat0 is found in a reference projection view. As noted previously, a reference value $P_{fat}$ represents the pixel value of a column of almost entirely fat tissue in a breast of thickness H. The thickness H is recorded in the Digital Imaging and Communications in Medicine (DICOM) image header.

Each tomosynthesis (DBT) projection (typically) employs the same x-ray tube spectrum. The time of exposure of each DBT projection varies according to the tissue(s) that detected, so that there is a sufficient signal-to-noise ratio for each exposure. Other tomosynthesis (DBT) units might apply different schemes but the general philosophy remains the same.

For example, in projected views:

$$\{I_j : 0 \leq j \leq n\} \quad\quad\quad EQ\ 1:$$

where view j=0 is the central projection and in this example we use this as the reference projection, but this is not necessarily so.

Each tomosynthesis projection view is denoted by integer j. In each tomosynthesis projection view Ij, there is a pixel (x). For each projection view, the breast thickness between the pixel (x) and the x-ray source is denoted by $Z_j(x)$ The x-ray exposure for each projection view $I_j$ is denoted by $E_j$. Generally it is measured in mAs. The x-ray exposure for the central projection view is denoted by $E_0$.

For each projection view Ij other than the central projection view a reference value Pfatj is estimated according to a reference value estimation equation given by equation 2 below.

$$Pfat_j \approx P_{fat0} * (E_j/E_0) * e^{(H-Zj(x))*\mu fat} \quad\quad EQ\ 2:$$

Note that to solve equation 2, the thickness Zj(x) is first estimated with a thickness estimation equation given by equation 3 below (similar equations could be used):

$$Z_j - H = H((1/\cos \theta_j - 1) - 1) - H((1 - \cos \theta_j)/\cos \theta_j) \quad\quad EQ\ 3:$$

Alternatively a tilt angle estimation to work out difference in thickness across the breast could also be applied, not to work out tilt, but to work out the variation in thickness according to view angle.

Figure 3:
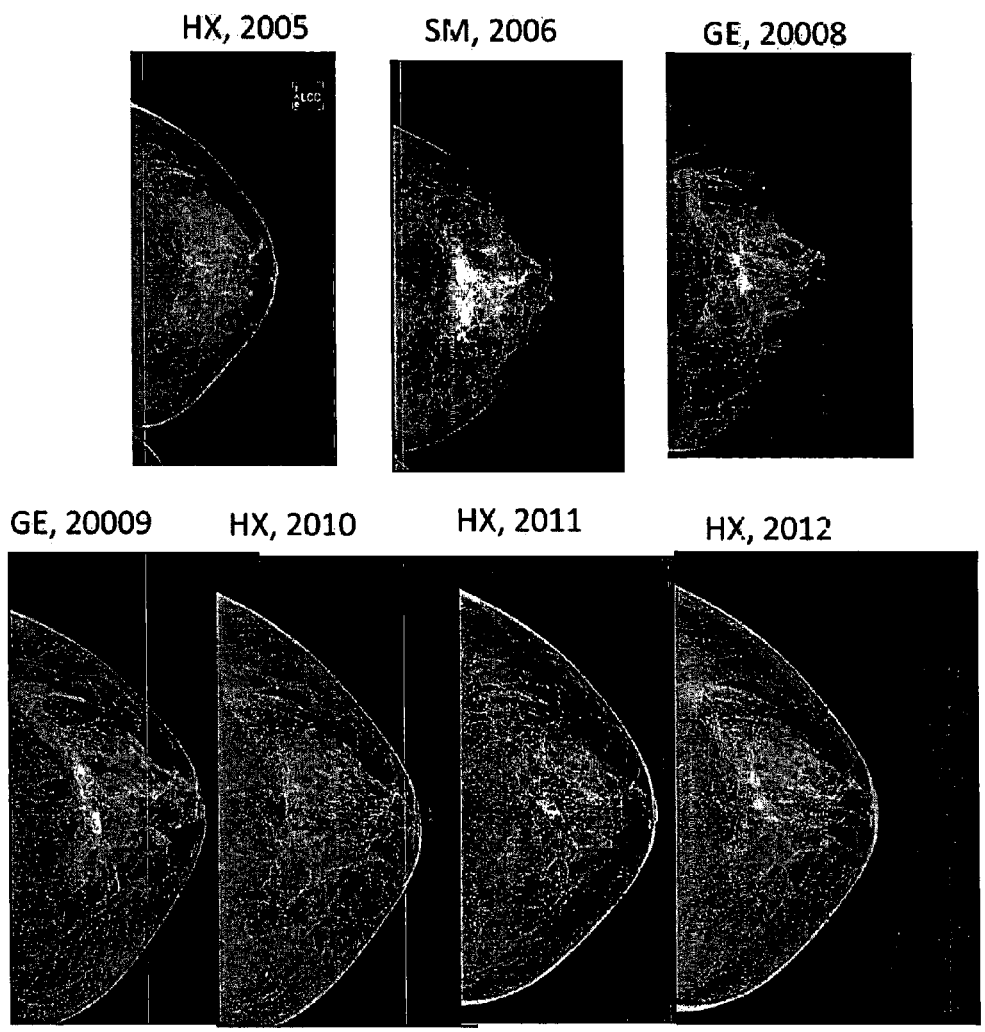
FIG. 3 shows a set of "For Presentation" images taken of the same breast over time where prior art processing algorithms give prior indication of change in density.

The angle θ is an angle of offset between each of the projection views as shown in FIGS. 2 and 3. Typically this angle is the same between all views. Thus the angle θ is often constant, but can vary according to manufacturer, but is often small, under 1 degree. So the $P_{fat}$ values do not change significantly for those tomosynthesis units where there is a small range of angles. In fact, they are predictable. If the angle becomes larger, the approximations need to be improved; but $P_{fat}j$ should still be able to be predicted, albeit adjusting the path length in each view Ij on a per pixel basis.

In this equation, $\mu_{fat}$ is the linear attenuation coefficient appropriate for the effective energy from the x-ray spectrum. Therefore for the higher exposure this shift in pixel value is expected.

Usually $P_{fat}j$, is different than $P_{fat}0$ because of the decreased (or increased) amount of fat, due to the different projection view Ij. The value of $P_{fat}j$ is the new fat reference level to be used for projection view Ij. If a tomosynthesis unit also adjusts the x-ray target and filter then that is accommodated via adjusting the $\mu_{fat}$ linear attenuation coefficient above using suitable models.

Where the values for $P_{fat}$ from the central projection are poor, the $P_{fat}$ value is adjusted to obtain consistent volumes of fibroglandular tissue across all the views.

Each view, plus the modified $P_{fat}$ will lead to an associated volume of dense tissue for the breast, say $V_j$. Evidently, the volume $V_j$ should be checked (assuming all the breast and only the same breast is seen in each view). The volume of dense breast tissue is the same whatever the projection view, so the volume Vj determined from each projection view should be the same as given in Equation 4, or least approximately so.

$$V_o = V_j,\ 0 \leq j \leq n \quad\quad EQ\ 4:$$

In equation 4 $V_o$ is the volume of dense tissue for the breast as determined by the reference projection view 0, and $V_j$ is the volume of dense tissue for the breast as determined by projection view j.

The fact that the volume of dense tissue is in fact the same for each projection view, j, according to Equation 4 is used to adjust the initially estimated reference value $P_{fat}$.

Steps to adjust the estimated reference value $P_{fat}$ to ensure accuracy of the estimate are, (i) initialise the value of $P_{fat}$ using the central projection and adaption noted above in Equation 1 and; (ii) adjust the value of $P_{fat}$ in a numerical descent algorithm so that the difference between any volume $V_j$ and $V_0$ is within a predetermined range according to a volumetric difference equation given by equation 5 below.

$$|V_0 - V_j(\text{Pfat}_j)| \approx 0 \qquad \text{EQ 5:}$$

In Equation 5 the variable $V_j(\text{Pfat}_j)$ is the volume of dense tissue for the breast as determined from projection view j and first estimated according to steps (i) and (ii) and then further adjusted so that equation 5 holds true.

The 'approximately zero' part of equation 5 is replaceable with 'less than a preselected range value'. Thus the accuracy of the volume of the dense tissue is adjusted to be within a preselected range.

Modified versions of equation 5 are also useable. For example equation 5 could be for the sum of all the differences between the standard projection view volume and each other projection view volume. Equation 5 could also be modified to be the square of the difference and so forth. Volume of breast could also be used for optimization.

Using multiple views of the same breast also allows a further improvement of the volume of dense tissue for the breast. This is achieved by estimating breast thickness in order to get the same volume of dense breast tissue for each projection in a similar fashion to the above, as well as building better breast edge models.

The reference, $P_{fat}$ is further optimised for accuracy by the use of confidence metrics. Thereby the confidence of a certain set of $P_{fat}$ values is optimized by using consensus.

During breast imaging using x-rays the breast is compressed via compression paddles. Such compression evens out the thickness of breast tissue and increases image quality, by reducing the thickness of tissue that the x-rays photons must penetrate, decreasing the amount of scattered radiation (scatter degrades image quality), reducing the required radiation dose, and holding the breast still (preventing motion blur).

A further advantage of the present invention is that it comprises qualitative metrics relating to compression paddle slant. The present invention provides means to redress the variation of the breast thickness from the chest wall to the breast margin. The present invention provides means to redress the resultant errors in estimating volumetric breast density caused by compression paddle slant.

Some compression paddles tilt during compression to aid patient comfort and yield better diagnostic images. The angle tilt of the compression paddle leads to variation of the breast thickness from the chest wall to the breast margin, in some cases up to 2 cm. Such paddle tilt has been recognised as a problem in estimating volumetric breast density since even small fluctuations of the breast height leads to large variations in the estimated breast density. Thus slanted paddles run the risk of invalidating many of the models currently used for quantification of breast density. Furthermore, poor correlation between views of the breast, or over time, might indicate that slant is the erroneous factor and thereby an important quality control metric. It is one of the inventive steps in this patent that estimate slant from the image thereby getting a better 3D view of the object being imaged.

According to an illustrative example, the angle of compression paddle slant is estimated on all pixels in the 'inner breast'. The 'inner breast' is the part of the breast compressed part by the paddle. An estimate of the 'inner breast' profile is outlined using a 'semi-circle model'. A regression line is fitted through all pixels in the inner breast using ordinary least squares and the slope of the regression line is used to obtain the tilt angle.

The reliability of the angle is then verified according to the following steps:

1/ The obtained tilt angle is checked to confirm that the tilt angle falls within a reasonable range;
2/ The percentage of points with a distance of less than a small number to the plane are counted. The percentage is used to judge whether the plane is a good representation of the pixel values.

If 1/ 2/ are met, this 'all tilt angle' is taken as the angle of compression paddle slant.

If 1/ 2/ are not met, then the angle of compression paddle slant can be estimated via fatty pixels in the inner breast. The fatty pixels in the inner breast are determined by means of the dense tissue thickness (or density map). All pixels that are less than a certain percent dense (according to the density map) are classified as fatty pixels. The tilt angle is estimated by fitting a regression line through fatty pixels in the inner breast. The regression line is fitted by using ordinary least squares. The slope of the regression line is used to obtain the tilt angle. Reliability of the obtained tilt angle is ascertained according to the following steps:

3) The obtained tilt angle is checked to confirm that it falls within a reasonable range;
4) The percentage of points with a distance of less than a small number to the plane are counted. The percentage is used to judge whether the plane is a good representation of the pixel values.

If 3 and 4 are met this 'fatty tilt angle' is taken as the angle of compression paddle slant.

If 3 and 4 are not met a 'default' tilt angle is assumed. This default angle is 'hardcoded' according to machine and/or manufacturer.

According to the algorithm outlined above an angle is provided. This angle is used to correct the image. The image might be corrected for example by:

5) subtracting/adding the equivalent of a fatty wedge from/to the entire image by subtracting/adding the equivalent of a fatty wedge from/to the breast whereby it is calculated for each pixel within the breast how much its height would change if the slant of the paddle is reverted. The change in height is then mapped to a change in intensity value. It is assumed hereby that the extra/less amount of tissue consists of purely fat.

In addition a 'new' breast thickness of the corrected breast might be calculated. That is, in the 'uncorrected breast' the paddle is tilted, and hence the breast thickness is not uniform across the compressed breast; in the 'corrected breast' the tilt is reverted and thus the compression paddle is parallel to the detector). The volumetric breast density is then calculated.

The angle of compression paddle slant should be relatively consistent between breasts, projection views, and over time, and should be consistent also between is operators and the x-ray systems (assuming similar paddles are in use).

According to the present invention a regional segmentation of the densest areas supplements the density maps whereby coherent, defined regions of interest are identified. This mapping (and thus segmentation) is achieved by mapping a thickness of dense tissue at each pixel to a colour (which could equally be a grey-scale). Such correlation is consistent between images and between breasts thus providing a reliable comparative reference between the images from any modality as the mapping is representative of the physical attributes of the breast; not the imaging process. For example, red might be used to highlight regions of highest density and thus most clinical interest.

As an alternative to display manipulation maps, location overlay maps might be used in CAD systems where salient information derived from the density maps is extracted and shown as an overlay, for example regions of high density are circled. The DICOM CAD SR report can be used to identify suspect areas and then those workstations with DICOM CAD SR capability could toggle off regions of high density.

Two useful variants of location overlay maps are:
1) high absolute density, defined as $$h_{dense} > X \qquad \text{EQ 6:}$$

to signal the intrinsic size of a tumour, if one were present; and 2) high relative density, defined as $$h_{dense}/H > Y \qquad \text{EQ 7:}$$

to signal regions that are dense relative to the size of the compressed breast—that is, would have the same value Y for women with large and with small breasts.

Alternatively, it is well known that tumours may be demarcated by examining the lines of equal intensity, representing tissue density, in an image especially where the gradient of those changes rapidly. In certain cases, the contour map may need to be adjusted using a suitable interpolation method such as an active contour or level set. The result of such processing is a curve demarcating the tumour (inside) from the normal surroundings (outside). It is also known that the shape of the resulting curve may convey clinically useful information such as spicules, or provide evidence that the curve surrounds a benign mass.

Along with displaying regions of interest, the present invention also displays in writing quantitative metrics of interest to the clinician such as maximum and minimum density in the region, volume of fibroglandular tissue and a general statistical description.

Where volumetric breast density is estimated, patient—specific radiation dose can also be calculated and thereby optimised. As per volumetric breast density, patient—specific radiation dose estimations require the use of numerous physics factors. Thus deviations in their consistency between left and right and between different breast views and over-time indicate potential quality issues.

As well as such high-level characteristics, numerous other lower level characteristics are measured during processing, all of which can be investigated and reported for quality control purposes. For example:
- the compression paddle slants according to the force applied to it, the angle of that paddle can be estimated and the angle kept consistent between breasts, between views, and over time. The angle should also be consistent between those who perform the mammograms and the x-ray systems themselves (assuming similar paddles are in use)
- the pressure applied to the breast (being force over contact area) should also be consistent between breasts, views and over time, and between operators and x-ray systems, any deviation in that consistency is cause for concern;
- the angle of the pectoral muscle can be detected and reported for MLO images notably consistent between breasts, over time and between operators and x-ray systems;
- the number of 'outliers' (whereby for the four standard images of the breast, one comes in very high) may indicate poor breast compression.
- number of images per study indicate numbers of retakes being taken As well as consistency measures, certain standard validity checks can be undertaken, for example compression force within bounds and compressed breast thickness within bounds.

The density metric has certain exceptions: sometimes both left and right images have poor compression, thus the respective densities would both be too high, but still similar. Alternatively, one breast may have undergone a cancer or had surgery, although such instances should not affect the overall metrics for a site which will have many times more normal than abnormal results when considered at an aggregated level.

Figure 4:
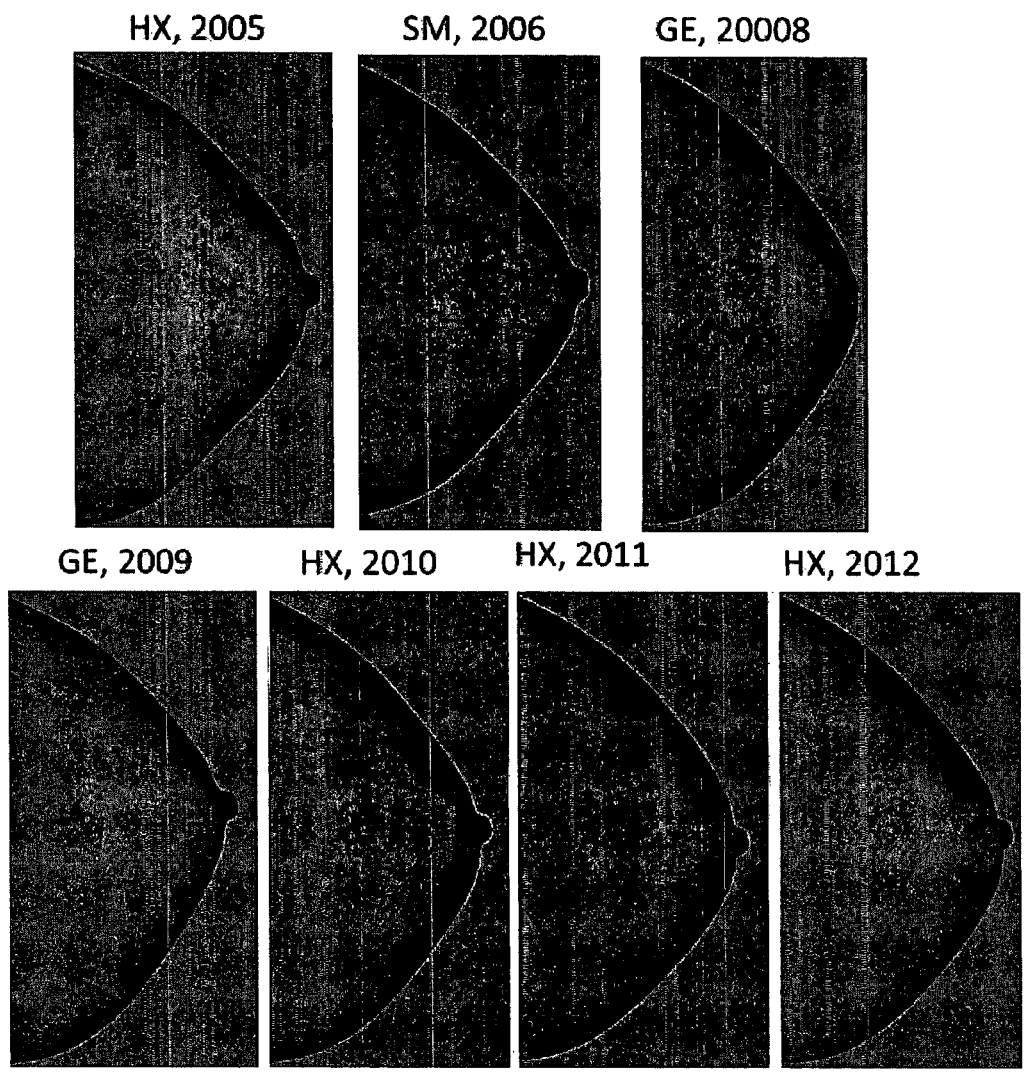
FIG. 4 shows a set of density maps in gray-scale which were generated by the present invention, where the standardized display makes change over time visually assessable.
Figure 5:
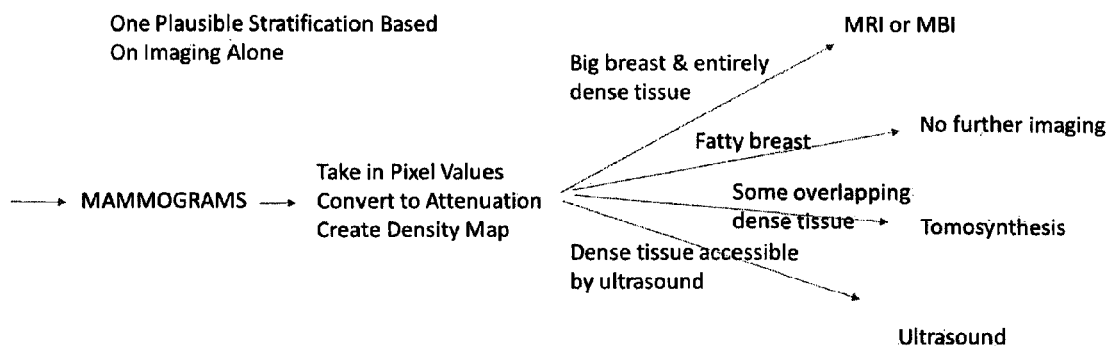
FIG. 5 shows a flow chart of an exemplary stratification of reconstruction identification of the densest region and of the optimal imaging modality for reconstruction identification of the densest regions.

Comparing temporal density maps also provides quality control metrics, if the maps have been generated robustly. Temporal images are taken of the breast every few years and one useful way of looking at them is by doing a quantitative reconstruction and then presenting the changes in a good way; this might help changes due to drugs such as Tamoxifen (Trade Mark), for example. Showing the presentation mammograms generated by the manufacturer over time is not reliable as the manufacturer's image processing algorithm(s) overruns the significant visual changes (see for example FIG. 3, and then see the density maps for the same woman displayed as FIG. 4).

The critical steps in displaying change over time are: registration; generation of density maps; and the use of temporal 'movies' of those objects in order to use the phi phenomenon in human vision (the phi phenomenon is tuned to discounting slow background changes whilst effectively detecting small apparent motions, such apparent motions corresponding either to displacements, changes in size of a structure, or substantive changes in image intensity).

An image mapping/registration process of each image set might comprise of four stages:
1. Breast boundary detection: Boundary detection is based on the segmentation mask at this stage. The detected boundary pixels will be used to detect and extract landmarks (stage 2); and used as feature points in the feature based image registration (stage 3). The boundary on each image of the image pair will be detected.
2. Landmark detection: Landmarks comprise the breast centre, the axilla point, the rib point and the nipple. The breast centre might be found via gray scale mass centre of all breast pixels or via thresholding means to extract dense tissues and locate the mass centre of the dense tissues. Location of the axilla point, rib point and nipple are then located via a new robust algorithm (described later) and the respective landmarks used for feature based image registration.
3. Feature based image registration: This is for initial mapping between two images. Both the landmarks and the boundary pixels are used for mapping. All the landmarks have known correspondences while the correspondences between two boundary pixel sets are dynamically set up using the Iterative Closest Point (ICP) algorithm.
4. Pixel based image registration: for fine mapping of the boundary and the texture in the breast. A special set of smoothing weights is applied to make sure that the textures are preserved.

By registering the breast boundaries and landmarks on the image set, the inner breast textures are transformed to similar locations on the images. The textures are preserved and presented to radiologists in a multiple frame multimedia format.

Similarly, a suitable optical flow algorithm can be constructed to monitor and appraise apparent motions corresponding either to displacements, changes in size of a structure, or substantive changes in image intensity and thus pick out change over time in a woman's breast. Such information can identify:

- a women whose breast density is not decreasing at the same rate as her peers, and thus who might be at more risk of developing breast cancer
- a woman whose images show an increase in breast density in a specific part of the breast (especially the upper, outer quadrant) and thus needs to have that region carefully investigated
- a woman who is taking chemo-prevention drug therapy and typically suffers side-effects (it is proven that if breast density does not decrease while the woman is taking the drug then the drug is likely affording no benefit to the woman)
- a woman with a 'suspect' object where that object appears to have enlarged or become more dense over the time between scans and thus warrants further investigation.

Temporal comparison which does not appear to work could indicate quality control issues, unless the comparison is performed on images which have been robustly generated. The present invention offers such a feature and, of course, temporal comparison can increasingly be done in 3D.

Robustness of density map reconstruction from different views would also allow better, more quantitative reconstruction in DBT. However, it has been demonstrated that the recorded image intensity (the energy imparted to the x-ray detector) confounds clinically important information about breast density with clinically unimportant imaging specific information, for example, tube voltage. It is thus evident that the 3D reconstruction from the set of DBT views would be better based on a density map of each projection, and a 3D representation of the breast demonstrating regions of interest and their location.

Once in 3D format, the following might be conveyed:
density of objects in the breast and whether the objects are discrete or over-lapping tissue
density of regions to define which areas of the breast need special investigation, especially relevant in very dense breasts which appear all white on the mammogram but which actually do contain important contrast differences
spatial position of regions, for example, proximity to skin, chest wall etc.
whether there are any left or right breast differences and thereby most suitable subsequent imaging modality and/or treatment.

In summary, quality metrics and subsequent stratification resulting from the quantitative construction described herein enable personalised outcomes more sensitive/responsive to risk as follows:
where dense tissue is seen to be forming in a certain region, that region can be flagged to the radiologist for closer inspection in the x-ray initially prior to further imaging according to the analysis laid out below
where dense tissue is prevalent throughout the breast, then more readers for the screening procedures might be advisable
where dense tissue is determined by the automated stratification system to be near the breast edge, ultrasound might be judged appropriate by the clinician, and either focussed or whole-breast ultrasound according to how wide a volume the dense tissue pertains across
where dense tissue is determined by the automated stratification system to be present in one image, but is determined to be at least partially resolved in a further image, the clinician may elect for tomosynthesis to resolve overlapping tissue;
where dense tissue appears dense in certain regional areas of the pseudo-3D and 3D density maps then the clinician might decide to perform window and levelling in that specific part of the x-ray, opt to view the density maps directly, and/or choose to investigate change over time by viewing sequential, registered density maps
where the patient is known to be taking certain drugs, for example, Tamoxifen (Trade Mark), it might be that viewing sequential, registered density maps is the correct next step to try and detect change in density at a global and regional level. Such comparison then allows decisions to be made on effectiveness of the drug and thus decisions on further treatment, or not
where dense tissue appears uniformly dense in both the pseudo-3D and 3D density maps, or if dense tissue is determined by the automated system to lie deeper in the breast, then MRI might be judged most appropriate by the clinician.

It is an advantage of the present invention that its robust quantitative reconstruction of an image of the human breast from multi-modality projection views, via use of a reference point or reference points from at least one view which is/are interpolated for other views, comprises quality metrics relating to optimal subsequent detection, diagnosis and intervention procedures and thereby enables population sensitive patient stratification and/or automated means on which to rely to stratify a patient.

The invention has been described by way of examples only, modifications and alternatives will be apparent to those skilled in the art. All such embodiments and modifications are intended to fall within the scope of the present invention.

The invention claimed is:

1. A method of quantitative reconstruction of an image of a human breast of predetermined thickness (H) comprising:
compressing the breast to decrease in thickness across the breast from a chest wall towards a nipple by a paddle tilted at a paddle tilt angle corresponding to the decrease in thickness along the length,
using an x-ray source to obtain a plurality of projection views including a reference projection view of the breast where each projection view is offset from another projection view by an angle theta($\theta$), wherein from each projection view an image is comprised of pixels representing a level of attenuation of x-rays passed through the breast from the x-ray source,
using a tilt angle estimation algorithm to find a tilt angle across the breast and thus the variation in breast thickness due to the paddle from each of the projection views, wherein the tilt angle estimation algorithm comprises using regression to fit a first regression line to the x-ray attenuation corresponding to all of the pixels in the portion of the breast compressed by the paddle and obtaining an 'all tilt angle' from a slope of the first regression line,
using regression to fit a second regression line to the x-ray attenuation corresponding to pixels in the portion of the breast compressed by the paddle having less than a preselected percentage of fat,
and obtaining a 'fatty tilt angle' from the slope of the second regression line, and
taking the 'fatty tilt angle' as the paddle tilt angle when a preselected fraction of the x-ray attenuations corresponding to pixels used to fit the first regression line are not within a preselected distance of the first regression line, and a preselected fraction of the attenuations corresponding to pixels used to fit the second regression line are within a preselected distance of the second regression line, using a reference point in the reference projection view to obtain a reference value $P_{fato}$ for the reference projection view, estimating a reference value ($P_{fatj}$) for each of the other projection views $I_j$ using a reference value estimation equation, using the estimated reference value ($P_{fatj}$) for each projection view to obtain a respective volume of fibroglandular tissue ($V_j$) for the projection view, and adjusting the estimated reference value ($P_{fatj}$) for each projection view to thereby determine the volume of fibroglandular tissue in the human breast to a preselected accuracy.

2. The method according to claim 1 wherein when the preselected fraction of the x-ray attenuations corresponding to the pixels used to fit the second regression line are not within a preselected distance of the second regression line, taking a default angle as the paddle tilt angle.

3. The method of quantitative reconstruction of an image of a human breast of predetermined thickness (H) according to claim 1 wherein a volumetric difference is a difference between a volume of fibroglandular tissue of a standard projection view and any of the volume $V_j$ of any other projection view.

4. A device arranged to quantitatively reconstruct an image of a human breast of predetermined thickness (H) according to the method of claim 1, comprising:

a paddle to compress the breast to decrease in thickness across the breast from the chest wall towards the nipple by a paddle tilted at a paddle tilt angle corresponding to the decrease in thickness along the length, an apparatus to obtain a plurality of projection views of a human breast by offsetting an x-ray source at an angle theta (θ) relative to the breast, wherein from each projection view an image is comprised of pixels representing a level of attenuation of x-rays passed through the breast from the x-ray source, a device to implement a tilt estimation algorithm to find the tilt across the breast and thus the variation in breast thickness, wherein the tilt angle estimation algorithm comprises using regression to fit a first regression line to the x-ray attenuation corresponding to all of the pixels in the portion of the breast compressed by the paddle and obtaining an 'all tilt angle' from the slope of the first regression line, and comprises using regression to fit a second regression line to the x-ray attenuation corresponding to pixels in the portion of the breast compressed by the paddle having less than a preselected percentage of fat, and obtaining a 'fatty tilt angle' from the slope of the second regression line, and taking the 'fatty tilt angle' as the paddle tilt angle when a preselected fraction of the attenuations corresponding to pixels used to fit the first (regression) line are not within a preselected distance of the first regression line, and a preselected fraction of the attenuations corresponding to pixels used to fit the second regression line are within a preselected distance of the second regression line, a device to obtain a reference value Pfato for the reference projection view by using aa reference point in the reference projection view, a device to estimate a reference value ($P_{fatj}$) for each of the other projection views $I_j$ using a reference value estimation equation, a device to use the estimated reference value ($P_{fatj}$) for each projection view to obtain a respective volume of fibroglandular tissue ($V_j$) for the projection view, a device to adjust the estimated reference value ($P_{fatj}$) for each projection view using a volumetric difference equation, and a device to thereby determine the volume of fibroglandular tissue in the human breast to a preselected accuracy.

* * * * *